US012617964B2

(12) United States Patent
Juan et al.

(10) Patent No.: US 12,617,964 B2
(45) Date of Patent: May 5, 2026

(54) DIGITAL PRINTED FABRIC, MANUFACTURING METHOD FOR DIGITAL PRINTED FABRIC, AND DIGITAL PRINTING INK

(71) Applicant: TAIWAN TEXTILE RESEARCH INSTITUTE, New Taipei City (TW)

(72) Inventors: Sun-Wen Juan, New Taipei City (TW); Chun-Hung Lin, New Taipei City (TW); Jung-Yu Tsai, New Taipei City (TW); Chia-Yi Lin, New Taipei City (TW)

(73) Assignee: TAIWAN TEXTILE RESEARCH INSTITUTE, New Taipei City (TW)

( * ) Notice: Subject to any disclaimer, the term of this patent is extended or adjusted under 35 U.S.C. 154(b) by 1025 days.

(21) Appl. No.: 17/744,788

(22) Filed: May 16, 2022

(65) Prior Publication Data

US 2022/0389256 A1 Dec. 8, 2022

(30) Foreign Application Priority Data

Jun. 2, 2021 (TW) ................................ 110120079

(51) Int. Cl.

*C09D 11/38* (2014.01)
*B41M 5/00* (2006.01)
*C09D 11/03* (2014.01)
*C09D 11/328* (2014.01)
*D06P 5/30* (2006.01)

(52) U.S. Cl.

CPC ........... *C09D 11/38* (2013.01); *B41M 5/0017* (2013.01); *B41M 5/0047* (2013.01); *B41M 5/0052* (2013.01); *C09D 11/03* (2013.01); *C09D 11/328* (2013.01); *D06P 5/30* (2013.01)

(58) Field of Classification Search

CPC ....... C09D 11/38; C09D 11/03; C09D 11/328; B41M 5/0047; B41M 5/0052; B41M 5/0017; D06P 5/30

USPC .............................................................. 8/494

See application file for complete search history.

(56) References Cited

U.S. PATENT DOCUMENTS

2004/0176530 A1 9/2004 Tielemans
2022/0087347 A1* 3/2022 Cay ........................... B32B 5/26

FOREIGN PATENT DOCUMENTS

| | | | | | |
|---|---|---|---|---|---|
| CN | 1644629 | A | * | 7/2005 | ............ C09B 69/10 |
| CN | 108729008 | A | | 11/2018 | |
| JP | 2020002218 | A | | 1/2020 | |
| TW | 201302927 | A | * | 1/2013 | |
| WO | WO2013046884 | | * | 4/2013 | .......... B41M 7/0018 |
| WO | 2018043415 | A1 | | 3/2018 | |
| WO | 2019013264 | A1 | | 1/2019 | |
| WO | 2019203786 | A1 | | 10/2019 | |

OTHER PUBLICATIONS

U.S. Appl. No. 17/308,223, filed May 5, 2021.

* cited by examiner

*Primary Examiner* — Amina S Khan

(74) *Attorney, Agent, or Firm* — McClure, Qualey & Rodack, LLP

(57) ABSTRACT

A digital printed fabric includes a base cloth and a digital printing ink disposed on the base cloth, and a manufacturing method for the digital printing ink includes the following steps. A first thermal process including mixing a dye, a crosslinking agent, and a polyol is performed, such that a polymer dye is formed, in which a reaction temperature of the first thermal process is between 70° C. and 90° C. A second thermal process including mixing the polymer dye and an aqueous bridging agent is performed, such that a first mixture is formed, in which a reaction temperature of the second thermal process is between 90° C. and 120° C. A third thermal process including mixing the first mixture and a chain extender is performed, such that the digital printing ink is formed, in which a reaction temperature of the third thermal process is between 120° C. and 150° C.

4 Claims, 1 Drawing Sheet

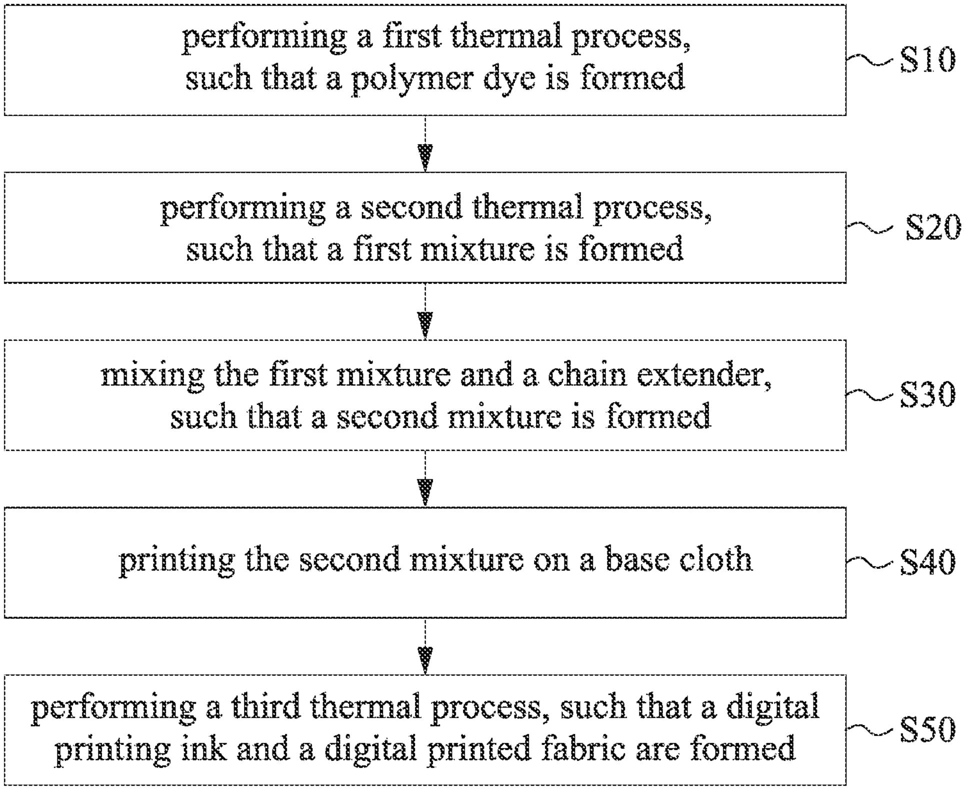
performing a first thermal process, such that a polymer dye is formed
S10
performing a second thermal process, such that a first mixture is formed
S20
mixing the first mixture and a chain extender, such that a second mixture is formed
S30
printing the second mixture on a base cloth
S40
performing a third thermal process, such that a digital printing ink and a digital printed fabric are formed
S50

DIGITAL PRINTED FABRIC, MANUFACTURING METHOD FOR DIGITAL PRINTED FABRIC, AND DIGITAL PRINTING INK

CROSS-REFERENCE TO RELATED APPLICATION

This application claims priority to Taiwan Application Serial Number 110120079, filed Jun. 2, 2021, which is herein incorporated by reference.

BACKGROUND

Field of Invention

The present disclosure relates to a digital printing ink, a digital printed fabric, and a manufacturing method for a digital printed fabric, and particularly relates to a digital printing ink for a digital printing process on fabrics, a digital printed fabric including a digital printing ink, and a manufacturing method for the digital printed fabric.

Description of Related Art

In the mass production of fabrics, cloth used as the raw material of fabrics will undergo a dyeing process. Generally, the dyeing process includes steps of placing the cloth in a dyeing machine and soaking the cloth in a dyeing solution or water, such that the cloth can be dyed and washed in the dyeing machine. However, the above-mentioned dyeing process is likely to cause excessive consumption of the dyeing solution, water resources, and energy, and before the dyeing process is performed, it is often necessary to perform a plenty of pre-treatment steps on the cloth, which is not conducive to saving time and costs. Therefore, how to efficiently dye the cloth while taking the color fastness of the cloth after dyeing into account is still an important issue for the textile industry.

SUMMARY

According to some embodiments of the present disclosure, a digital printed fabric includes a base cloth and a digital printing ink. The digital printing ink is disposed on the base cloth, and a manufacturing method for the digital printing ink includes the following steps. A first thermal process including a step of mixing a dye, a crosslinking agent, and a polyol is performed, such that a polymer dye is formed, in which a reaction temperature of the first thermal process is between 70° C. and 90° C. A second thermal process including a step of mixing the polymer dye and an aqueous bridging agent is performed, such that a first mixture is formed, in which a reaction temperature of the second thermal process is between 90° C. and 120° C. A third thermal process including a step of mixing the first mixture and a chain extender is performed, such that the digital printing ink is formed, in which a reaction temperature of the third thermal process is between 120° C. and 150° C.

In some embodiments of the present disclosure, the chain extender includes a first reagent and a second reagent, the first reagent includes a polyamine, and a molecular structure of the second reagent is the same as a molecular structure of the aqueous bridging agent.

In some embodiments of the present disclosure, the aqueous bridging agent includes a structural unit represented by formula (1), formula (1)

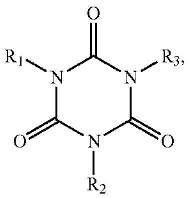

in which any two or more of the $R_1$, $R_2$, and $R_3$ include a structural unit represented by formula (2), formula (2)

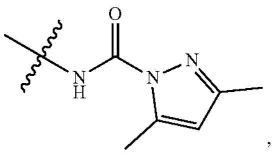

, and when any two of the $R_1$, $R_2$, and $R_3$ include a structural unit represented by formula (2), the other of the $R_1$, $R_2$, and $R_3$ includes a hydrophilic group.

In some embodiments of the present disclosure, the base cloth has a plurality of yarns interwoven with each other, and the digital printing ink wraps each of the yarns.

In some embodiments of the present disclosure, the base cloth has at least two layers, and the digital printing ink is disposed between the two layers of the base cloth.

According to some other embodiments of the present disclosure, a manufacturing method for a digital printed fabric includes the following steps. A first thermal process including a step of mixing a dye, a crosslinking agent, and a polyol is performed, such that a polyol is formed, in which a reaction temperature of the first thermal process is between 70° C. and 90° C. A second thermal process including a step of mixing the polymer dye and an aqueous bridging agent is performed, such that a first mixture is formed, in which a reaction temperature of the second thermal process is between 90° C. and 120° C. The first mixture and a chain extender are mixed, such that a second mixture is formed. The second mixture is printed on a base cloth, such that the second mixture covers the base cloth and infiltrates into the base cloth. A third thermal process is performed, such that the second mixture is formed into a digital printing ink, and the digital printing ink is disposed on the base cloth, in which a reaction temperature of the second thermal process is between 120° C. and 150° C.

In some embodiments of the present disclosure, a reaction time of the second thermal process is between 20 minutes and 60 minutes, and a reaction time of the third thermal process is between 2 minutes and 5 minutes.

According to some other embodiments of the present disclosure, a digital printing ink for a digital printing process on fabrics is manufactured by a manufacturing method including the following steps. A first thermal process including a step of mixing a dye, a crosslinking agent, and a polyol is performed, such that a polyol is formed, in which a reaction temperature of the first thermal process is between 70° C. and 90° C. A second thermal process including a step of mixing the polymer dye and an aqueous bridging agent is performed, such that a first mixture is formed, in which a reaction temperature of the second thermal process is between 90° C. and 120° C. A third thermal process including a step of mixing the first mixture and a chain extender is performed, such that the digital printing ink is formed, in which a reaction temperature of the third thermal process is between 120° C. and 150° C.

In some embodiments of the present disclosure, the chain extender includes a first reagent and a second reagent, the first reagent includes a polyamine, and a molecular structure of the second reagent is the same as a molecular structure of the aqueous bridging agent.

In some embodiments of the present disclosure, a weight average molecular weight of the polyol is between 200 g/mole and 3000 g/mole.

In the aforementioned embodiments of the present disclosure, the digital printed fabric of the present disclosure includes the base cloth and the digital printing ink, and the digital printing ink is firmly disposed on the base cloth, thereby improving the washing fastness and the crocking fastness of the digital printed fabric. During the manufacturing process for the digital printed fabric, the aqueous bridging agent can be ensured to undergo a staged reaction by adjusting the reaction temperature of each stage of the two-stage thermal process (i.e., the second thermal process and the third thermal process), such that the subsequently formed digital printing ink has a complicated network structure and is firmly disposed on the base cloth, which is beneficial for improving the washing fastness and the crocking fastness of the digital printed fabric. Accordingly, the digital printed fabric of the present disclosure can still maintain its functions well after multiple times of washing and wearing, and can be widely used in the field of functional apparel textiles. On the other hand, since the digital printing ink is disposed on the base cloth by printing instead of dipping, tedious processes such as pre-treatment, high-temperature drying treatment, and washing treatment can be omitted, such that the digital printing ink is widely applicable to a variety of materials and types of cloths, and the convenience of the manufacturing process can be improved.

BRIEF DESCRIPTION OF THE DRAWINGS

The disclosure can be more fully understood by reading the following detailed description of the embodiments, with reference made to the accompanying drawings as follows:

FIG. 1 is a flowchart illustrating a manufacturing method for a digital printed fabric according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a digital printing ink for a digital printing process of fabric, a digital printed fabric including the digital printing ink, and a manufacturing method for the digital printed fabric using the digital printing ink. Through the manufacturing method for the digital printed fabric of the present disclosure, a precursor of the digital printing ink (e.g., a second mixture) is directly printed on a base cloth, and in conjunction with a third thermal process, the formed digital printing ink can be firmly disposed on the base cloth, thereby improving the washing fastness and crocking fastness of the digital printed fabric manufactured by the digital printing ink. On the other hand, since the digital printing ink is disposed on the base cloth by printing instead of dipping, tedious processes such as pre-treatment, high-temperature drying treatment, and washing treatment can be omitted, such that the digital printing ink is widely applicable to a variety of materials and types of cloths, and the convenience of the manufacturing process can be improved.

FIG. 1 is a flowchart illustrating a manufacturing method for a digital printed fabric according to some embodiments of the present disclosure. Reference is made to FIG. 1. The manufacturing method for the digital printed fabric includes steps S10 to S50. In step S10, a first thermal process is performed, such that a polymer dye is formed. In step S20, a second thermal process is performed, such that a first mixture is formed. In step S30, the first mixture and chain extender is mixed, such that a second mixture is formed. In step S40, the second mixture is printed on a base cloth. In step S50, a third thermal process is performed, such that a digital printing ink and the digital printed fabric are formed. The aforementioned steps will further be discussed in the following descriptions.

Firstly, a dye, a crosslinking agent, and a polyol are provided. In some embodiments, the dye may include at least one hydroxyl group or at least one amine group, so as to react well with the crosslinking agent. In some embodiments, the crosslinking agent may include at least one isocyanate group, so as to react well with the dye and the polyol. In some preferred embodiments, the crosslinking agent may have a linear structure and include two isocyanate groups to provide a small steric hindrance, such that the reactivity of the crosslinking agent is enhanced, and the density of the dye subsequently disposed on the base cloth can be increased. In some embodiments, the crosslinking agent may be, for example, hexamethylene diisocyanate (HDI). In some embodiments, the polyol can be, for example, polyethylene glycol (PEG), polypropylene glycol (PPG), polytetramethylene ether glycol (PTMEG), or combinations thereof. In some embodiments, a weight average molecular weight of the polyol may be between 200 g/mole and 3000 g/mole.

Next, in step S10, a first thermal process is performed, in which the first thermal process includes a step of mixing the dye, the crosslinking agent, and the polyol, such that a polymer dye is formed. A reaction temperature of the first thermal process of the present disclosure is between 70° C. and 90° C. and in some embodiments, a reaction time of the first thermal process may be between 2 hours and 4 hours, so as to ensure that the reaction fully proceeds. In some embodiments, an amount of the dye used may be between 0.5 parts by weight and 1.5 parts by weight, an amount of crosslinking agent used may be between 1.0 part by weight and 3.0 parts by weight, and an amount of polyol used may be between 0.1 parts by weight and 1.8 parts by weight. As mentioned above, since the weight average molecular weight of the polyol may be between 200 g/mole to 3000 g/mole, the subsequent formed digital printed fabric can have good washing fastness, crocking fastness, and softness, and the manufacturing costs can be effectively reduced.

Specifically, if the weight average molecular weight of the polyol is less than 200 g/mole, the subsequent formed digital printing ink may not be firmly disposed on the base cloth, such that the digital printed fabric has poor washing fastness and crocking fastness; if the weight average molecular weight of the polyol is greater than 3000 g/mole, the digital printed fabric may have poor softness, and the required reaction time may easily be increased, which is not conducive to reducing the manufacturing costs.

After step S10 is completed, the polymer dye can be obtained. In some embodiments, the polymer dye may include a polyurea (PUA) block, a polyurethane (PU) block, or combinations thereof. In some preferred embodiments, the polymer dye has a linear structure with a terminal including a hydroxyl group, so as to continuously react in the subsequent second thermal process. The polymer dye formed in step S10 can make the subsequently formed digital printing ink present its expected color.

Then, an aqueous bridging agent is provided. In some embodiments, the aqueous bridging agent may include isocyanate trimer. Specifically, the aqueous bridging agent may include a structural unit represented by formula (1), formula (1)

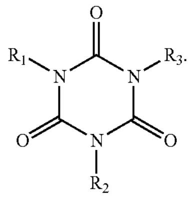

For example, the aqueous bridging agent may include an aliphatic isocyanate trimer, an aromatic isocyanate trimer, or combinations thereof. In some embodiments, the aliphatic isocyanate may be hexamethylene diisocyanate (HDI), trimethyl hexamethylene diisocyanate (TMHDI), xylylene diisocyanate (XDI), isophorone diisocyanate (IPDI), dicyclohexylmethane-4,4'-diisocyanate (HMDI), or hydrogenated tolylene diisocyanate (HTDI), and the aromatic isocyanate may be tolylene diisocyanate (TDI) or diphenyl methane diisocyanate (MDI). In some embodiments, at least two terminals of the isocyanate trimer may include functional groups such as 3,5-dimethylpyrazole (DMP), and the remaining terminal(s) of the isocyanate trimer may include a hydrophilic group. Specifically, in the aqueous bridging agent represented by formula (1), any two or more of the $R_1$, $R_2$, and $R_3$ may include a structural unit represented by formula (2), formula (2)

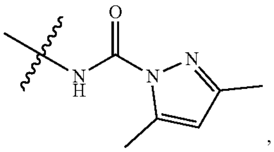

, and when any two of the $R_1$, $R_2$, and $R_3$ include a structural unit represented by formula (2), the other of the $R_1$, $R_2$, and $R_3$ includes a hydrophilic group, in which the hydrophilic group is, for example, a functional group derived from dimethylol propionic acid, dimethylol butyric acid, and/or N-methyldiethanolamine. In some embodiments, the molecular structure of the aqueous bridging agent may include five terminals, at least four of which may include functional groups such as 3,5-dimethylpyrazole, and the remaining terminal(s) may include hydrophilic groups. As a result, a single aqueous bridging agent can react subsequently with more of the polymer dyes, thereby enhancing the chromaticity of the digital printing ink.

Next, in step S20, a second thermal process is performed, in which the second thermal process includes a step of mixing the polymer dye and the aqueous bridging agent, such that a first mixture is formed. A reaction temperature of the second thermal process of the present disclosure is between 90° C. and 120° C., and in some embodiments, a reaction time of the second thermal process can be between 20 minutes and 60 minutes, so as to ensure that the reaction proceeds to a certain extent. In some embodiments, an amount of the aqueous bridging agent used may be between 2.5 parts by weight and 12.5 parts by weight. After step S20 is completed, the first mixture can be obtained. In some embodiments, a molecular structure of the first mixture may include three terminals, one of which includes the hydrophilic group, another of which includes the unreacted 3,5-dimethylpyrazole group, and the remaining of which includes a group of the reacted polymer dye. In some embodiments, the molecular structure of the first mixture may include five terminals, one of which includes the hydrophilic group, another two of which include the unreacted 3,5-dimethylpyrazole groups, and the remaining two of which include groups of the reacted polymer dye.

Subsequently, in step S30, the first mixture and a chain extender are mixed, such that a second mixture is formed. In some embodiments, an amount of the chain extender used may be between 2.5 parts by weight and 11.5 parts by weight. The chain extender can increase the chain length and the crosslinking degree of the first mixture in the subsequent thermal process, such that the digital printing ink is firmly disposed on the base cloth, thereby improving the washing fastness and crocking fastness of the digital printed fabric. The chain extender of the present disclosure includes a first reagent and a second reagent. In some embodiments, the first reagent may include a polyamine. For example, the first reagent may have a molecular structure shown in formula (3), formula (3)

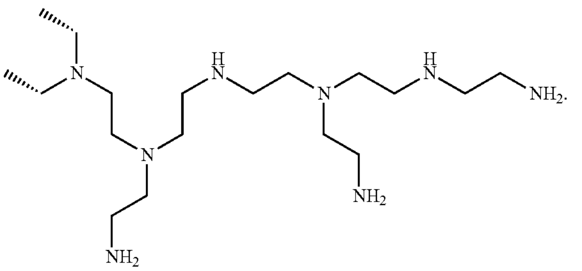

In some embodiments, the first reagent may further include a polyol, and the polyol may be the same or different from the polyol used for the first thermal process. For example, the first reagent may include ethylene glycol, propylene glycol, triethylene glycol, tetraethylene glycol, glycerol, 1,3-butanediol, 1,4-butanediol, pentane glycol, hexanediol, octanediol, pentaerythritol, xylitol, sorbitol, trimethylolmethane, trimethylolethane, sucrose, or combinations thereof.

In some embodiments, the second reagent may include isocyanate trimer. Specifically, the second reagent may include a structural unit represented by the aforementioned formula (1). For example, the second reagent may include an aliphatic isocyanate (e.g., HDI, THMDI, or XDI) trimer, an alicyclic isocyanate (e.g., IPDI, HMDI, HTDI) trimer, an aromatic isocyanate (e.g., TDI or MDI) trimer, or combinations thereof. In some embodiments, at least two terminals of the isocyanate trimer may include functional groups such as 3,5-dimethylpyrazole (DMP), and the remaining terminal (s) of the isocyanate trimer may include a hydrophilic group. Specifically, in the second reagent represented by the aforementioned formula (1), any two or more of the $R_1$, $R_2$, and $R_3$ may include a structural unit represented by the aforementioned formula (2), and when any two of the $R_1$, $R_2$, and $R_3$ include a structural unit represented by formula (2), the other of the $R_1$, $R_2$, and $R_3$ includes a hydrophilic group, in which the hydrophilic group is, for example, a functional group derived from dimethylol propionic acid, dimethylol butyric acid, and/or N-methyldiethanolamine. In some preferred embodiments, the molecular structure of the second reagent may include five terminals, at least four of which may include functional groups such as 3,5-dimethylpyrazole, and the remaining terminal(s) may include hydrophilic groups. In more preferred embodiments, the molecular structure of the second reagent may be the same as a molecular structure of the aqueous bridging agent, thereby improving the convenience of the thermal process.

In some embodiments, an appropriate amount of a surfactant and an appropriate amount of a defoamer can be further added to the mixed first mixture and the chain extender, that is, the second mixture can optionally include the surfactant and the defoamer. The surfactant can maintain the stability of the particle size of the particles in the digital printing ink to be formed, and the defoamer can ensure that there is no foam in the second mixture, such that the printing process is facilitated. In some embodiments, the surfactant can be, for example, polydimethylsiloxane, polyether-modified silicone, polyether-modified polydimethylsiloxane, or combinations thereof. In some embodiments, the defoamer may be, for example, polyether-modified polydimethylsiloxane, foam-breaking polysiloxane, a mixture of foam-breaking polysiloxane and hydrophobic particles dissolved in polyethylene glycol, or combinations thereof.

Next, in step S40, the second mixture is printed on the base cloth, such that the second mixture covers the base cloth and infiltrates into the base cloth, in which the base cloth may include a knitted fabric, a woven fabric, a non-woven fabric, etc. In detail, when the second mixture is printed on the base cloth, each ingredient in the second mixture can be attached to the surface of each fiber or yarn. In some embodiments, a base material of the base cloth may be, for example, polyethylene terephthalate, so as to prevent the base cloth from chemically reacting with the ingredients in the second mixture during the subsequent thermal process. By directly printing the precursor of the digital printing ink (i.e., the second mixture) on the base cloth, waste of the dye and excessive energy consumption can be avoided, and the convenience of the manufacturing process can be improved, such that the base cloth can be dyed efficiently. In addition, since the digital printing ink is disposed on the base cloth by printing instead of dipping, tedious processes such as pre-treatment, high-temperature drying treatment, and washing treatment can be omitted, such that the digital printing ink is widely applicable to a variety of materials and types of cloths, and the convenience of the manufacturing process can be improved.

Subsequently, in step S50, the third thermal process is performed, such that the digital printing ink and the digital printed fabric are formed. A reaction temperature of the third thermal process is between 120° C. and 150° C. and in some embodiments, a reaction time of the second thermal process may be between 2 minutes and 5 minutes, so as to meet the requirements of the post-treatment of the industry. In detail, during the third thermal process, the ingredients in the second mixture attached to the surface of the yarn can react with each other to crosslink with each other, so as to form the digital printing ink, and the digital printing ink can be firmly disposed on the base cloth to form the digital printed fabric. In other words, by performing the third thermal process, the digital printing ink can be formed at the same time as the digital printing ink is firmly disposed on the base cloth. On the other hand, since the reaction time of the third thermal process is short, compared with the tedious traditional processes such as high-temperature drying treatment, washing treatment, etc., the manufacturing method for the digital printed fabric of the present disclosure is more convenient.

In some embodiments, the base cloth of the digital printed fabric has at least two layers. Specifically, the interlayers of the base cloth may be three-dimensional spaces naturally formed by yarns or fibers after being interwoven or stacked, and the yarns or fibers may be interwoven or entangled between the two layers of the base cloth. For example, when the base cloth of the digital printed fabric is a woven fabric, the interlayers of the base cloth may be three-dimensional spaces formed by the warp yarns separated by the weft yarns. As another example, when the base cloth of the digital printed fabric is a knitted fabric, the interlayers of the base cloth may be three-dimensional spaces formed after interlacing the yarns into knitted loops. As further examples, when the base cloth of the digital printed fabric is a non-woven fabric, the interlayers of the base cloth may be gaps formed by the stacking of yarns (or fibers). In some embodiments, the digital printing ink is disposed between the two layers of the base cloth to be firmly disposed on the base cloth. In this regard, the digital printing ink can also wrap each yarn or fiber of the base cloth, so as to be disposed between the two layers of the base cloth.

After performing the above steps S10 to S50, the digital printed fabric of the present disclosure can be obtained, and the digital printing ink in the digital printed fabric is firmly disposed on the base cloth. The digital printing ink formed by the staged thermal process can form a complicated network structure on the fibers or yarns of the base cloth, such that the digital printing ink is even more firmly disposed on the base cloth. Accordingly, the formed digital printed fabric can be ensured to present the expected color and has good washing fastness and crocking fastness. It should be particularly noted that by the “staged addition” of the aqueous bridging agent and the setting of the reaction temperature of each of the second and third thermal processes in the present disclosure, the aqueous bridging agent and its derivatives produced during the thermal process can be ensured to undergo a “staged reaction”. In detail, since the aqueous bridging agent of the present disclosure only partially reacts at a temperature of 90° C. to 120° C., and can completely react at a temperature of 120° C. to 150° C., the reaction temperatures of the second and third thermal processes are respectively set in the above range to ensure that portions of the aqueous bridging agent are preserved for a crosslinking reaction during the third thermal process. Accordingly, the subsequently formed digital printing ink can have a complicated network structure, which is beneficial for improving the washing fastness and crocking fastness of the digital printed fabric.

In the following descriptions, features and effects of the present disclosure will be described more specifically with reference to some embodiments. It is noted that without exceeding the scope of the present disclosure, the materials used, their amount and ratio, processing details, processing flow, etc. can be appropriately alternated. Therefore, the present disclosure should not be interpreted restrictively by the embodiments provided below. The ingredients and their contents in each embodiment are shown in Table 1. Each embodiment is fabricated through the aforementioned steps S10 to S50, in which the reaction temperature of the first thermal process is 80° C., the reaction temperature of the second thermal process is 110° C., and the reaction temperature of the third thermal process is 130° C.

TABLE 1

| | | digital printing ink | | | | | |
|---|---|---|---|---|---|---|---|
| | | | | | aqueous | chain extender | |
| | base cloth | dye | crosslinking agent | polyol | bridging agent | first reagent | second reagent |
| embodiment 1 | PET knitted fabric | 1 | 1.30 | 0.15 | 8.00 | 3.50 | 1.00 |
| embodiment 2 | cotton knitted fabric | | | | | | |
| embodiment 3 | nylon knitted fabric | | | | | | |
| embodiment 4 | PET knitted fabric | 1 | 1.30 | 0.15 | 3.00 | 3.00 | 1.50 |
| embodiment 5 | PET knitted fabric | 1 | 1.30 | 0.75 | 5.00 | 3.00 | 3.00 |
| embodiment 6 | PET knitted fabric | 1 | 1.30 | 0.75 | 6.00 | 3.50 | 2.00 |
| embodiment 7 | PET knitted fabric | 1 | 1.95 | 0.325 | 10.00 | 5.00 | 3.00 |
| embodiment 8 | PET knitted fabric | 1 | 2.60 | 1.50 | 12.00 | 7.00 | 4.00 |

Note:
The unit of the contents is parts by weight.

Experiment 1: Washing Fastness Test and Dry/Wet Crocking Fastness Test on Digital Printed Fabrics In this experiment, a washing fastness test and a dry/wet crocking fastness test are carried out on the digital printed fabrics of embodiments 1 to 3. The washing fastness test is performed through the AATCC61 test method, and the dry/wet rubbing fastness test is performed through the AATCC8 test method. The results are shown in Table 2.

TABLE 2

| | Washing Fastness | Dry Crocking Fastness | Wet Crocking Fastness |
|---|---|---|---|
| embodiment 1 | grade 4-5 | grade 4-5 | grade 3-5 |
| embodiment 2 | grade 4-5 | grade 4-5 | grade 3-5 |
| embodiment 3 | grade 4-5 | grade 4-5 | grade 3-5 |
| embodiment 4 | grade 3-4 | grade 3-4 | grade 3-4 |
| embodiment 5 | grade 4-5 | grade 4-5 | grade 4-5 |
| embodiment 6 | grade 4-5 | grade 4-5 | grade 3-5 |
| embodiment 7 | grade 4-5 | grade 4-5 | grade 3-4 |
| embodiment 8 | grade 4-5 | grade 4-5 | grade 4-5 |

As shown in Table 2, the digital printed fabrics manufactured by the manufacturing method for the digital printed fabric of the present disclosure show good performance in washing fastness and dry/wet crocking fastness, successfully overcoming problems of poor washing fastness and dry/wet crocking fastness caused by the use of conventional processing reagents.

Experiment 2: CMC Color Difference ΔE Test on Digital Printed Fabrics

In this experiment, a spectrometer (type: data color 650) is used to carry out a CMC color difference ΔE test on the digital printed fabrics of embodiments 1 and 6-8 with an aperture of 30 mm, a D65 light source, and an angle of 10 degrees. The test method is to randomly cut 9 blocks with an area of 7 cm×9 cm on the surface of the digital printed fabric, and measure the CMC color difference ΔE between 3 blocks. The results are shown in Table 3.

TABLE 3

| | CMC Color Difference ΔE |
|---|---|
| embodiment 1 | 0.48 |
| embodiment 6 | 0.67 |
| embodiment 7 | 0.63 |
| embodiment 8 | 0.31 |

As shown in Table 3, the GMC color difference ΔE of the digital printed fabric of each embodiment is less than 1.0, showing that the digital printed fabrics manufactured by the manufacturing method for the digital printed fabric of the present disclosure can have good levelling dyeing properties.

According to the aforementioned embodiments of the present disclosure, the digital printed fabric of the present disclosure includes the base cloth and the digital printing ink, and the digital printing ink is firmly disposed on the base cloth, thereby improving the washing fastness and the crocking fastness of the digital printed fabric. Through the manufacturing method for the digital printed fabric of the present disclosure, a precursor of the digital printing ink (e.g., a second mixture) is directly printed on a base cloth, and in conjunction with a third thermal process, the formed digital printing ink can be firmly disposed on the base cloth, thereby improving the washing fastness and crocking fastness of the digital printed fabric manufactured by the digital printing ink. On the other hand, since the digital printing ink is disposed on the base cloth by printing instead of dipping, tedious processes such as pre-treatment, high-temperature drying treatment, and washing treatment can be omitted, such that the digital printing ink is widely applicable to a variety of materials and types of cloths, and the convenience of the manufacturing process can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A digital printed fabric, comprising:

a base cloth; and a digital printing ink disposed on the base cloth, wherein a manufacturing method for the digital printing ink comprises:

performing a first thermal process comprising a step of mixing a dye, a crosslinking agent, and a polyol, such that a polymer dye is formed, wherein a reaction temperature of the first thermal process is between 70° C. and 90° C.;

performing a second thermal process comprising a step of mixing the polymer dye and an aqueous bridging agent, such that a first mixture is formed, wherein a reaction temperature of the second thermal process is between 90° C. and 120° C., and the aqueous bridging agent comprises a structural unit represented by formula (1), wherein formula (1) is

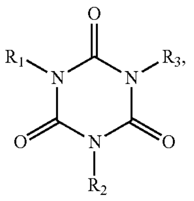

wherein any two or more of the $R_1$, $R_2$, and $R_3$ comprise a structural unit represented by formula (2), wherein formula (2) is

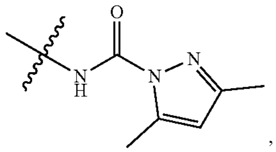

, and when any two of the $R_1$, $R_2$, and $R_3$ comprise a structural unit represented by formula (2), the other of the R1, R2, and R3 comprises a hydrophilic group; and performing a third thermal process comprising a step of mixing the first mixture and a chain extender, such that the digital printing ink is formed, wherein a reaction temperature of the third thermal process is between 120° C. and 150° C.

2. The digital printed fabric of claim 1, wherein the chain extender comprises a first reagent and a second reagent, the first reagent comprises a polyamine, and a molecular structure of the second reagent is the same as a molecular structure of the aqueous bridging agent.

3. The digital printed fabric of claim 1, wherein the base cloth has a plurality of yarns interwoven with each other, and the digital printing ink wraps each of the yarns.

4. The digital printed fabric of claim 1, wherein the base cloth has at least two layers, and the digital printing ink is disposed between the two layers of the base cloth.

* * * * *